United States Patent
DeWitt, Jr. et al.

(10) Patent No.: US 7,239,980 B2
(45) Date of Patent: Jul. 3, 2007

(54) METHOD AND APPARATUS FOR ADAPTIVE TRACING WITH DIFFERENT PROCESSOR FREQUENCIES

(75) Inventors: Jimmie Earl DeWitt, Jr., Georgetown, TX (US); Frank E. Levine, Austin, TX (US); Enio Manuel Pineda, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/214,564

(22) Filed: Aug. 30, 2005

(65) Prior Publication Data

US 2007/0050174 A1   Mar. 1, 2007

(51) Int. Cl.
*G06F 15/00* (2006.01)
(52) U.S. Cl. ....................... 702/187; 702/185
(58) Field of Classification Search ............. 702/185, 702/187
See application file for complete search history.

(56) References Cited

U.S. PATENT DOCUMENTS

| | | | |
|---|---|---|---|
| 6,711,447 | B1 | 3/2004 | Saeed |
| 6,735,707 | B1 | 5/2004 | Kapil |
| 6,832,326 | B2 | 12/2004 | Kubo et al. |
| 2005/0138484 | A1* | 6/2005 | Moyer et al. .................. 714/47 |

* cited by examiner

*Primary Examiner*—Michael P. Nghiem
*Assistant Examiner*—Stephen J Cherry
(74) *Attorney, Agent, or Firm*—Duke W. Yee; Herman Rodriguez; Wayne P. Bailey

(57) ABSTRACT

A method, apparatus, and computer usable program code for managing trace records. A set of traces is generated for a set of processors. A trace is generated in the set of traces for each processor within the set of processors. A record of the frequency change is stored in the set of traces in response to a frequency change in a processor within the set of processors. Trace records are combined in the set of traces using the record of the frequency change to determine a correct order for the records.

17 Claims, 4 Drawing Sheets

{
set count=0
Issue an Interprocessor Interrupt to all processors
Each processor fielding the interrupt:
increments the count
Do While (count<total_number_processors) continue; // loop until count reaches total number of processors
read time
}

METHOD AND APPARATUS FOR ADAPTIVE TRACING WITH DIFFERENT PROCESSOR FREQUENCIES

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for creating and ordering trace records.

2. Description of the Related Art

In order to reduce heat and power consumption, a data processing system may change the frequency of one or more processors. Alternatively, different processors in the same data processing system may have different fixed frequencies. The dynamic frequency changes may be caused by a variety of reasons. For example, a detection of overheating or excessive power consumption may cause a reduction in frequency in one or more processors. Additionally, a desire to reduce power consumption in a portable data processing system, such as a laptop, is another reason for changing frequencies based on usage. Other conditions also may cause changes in processor frequencies. For example, changes in processor frequencies may be based upon information about an application. For example, having knowledge that an application has a large number of cache misses may cause a lowering of processor frequency to reduce power since the overall performance may only be minimally affected due to the waiting for those cache misses.

This frequency change in processors during the operation of a data processing system increases difficulty in tracing events. Typically, separate processor buffers are used to record trace events. A trace record contains information or data about an event that occurs during a trace. The trace records stored in a buffer are referred to as a trace. The performance of a data processing system is identified through using a software performance tool, trace facility, or trace system. One known software performance tool is a trace tool. A trace tool may be used for more than one technique to provide trace information that indicated execution flows for an executing program. A trace may contain data about the execution of code. For example, a trace may contain trace records about events generated during the execution of the code. A trace may include information, such as, a process identifier, a thread identifier, and a program counter. Information in a trace may vary depending on a particular profile or analysis that is to be performed. A record is a unit of information relating to an event. For some applications, the correct ordering of the trace records are critical to the understanding of the item being analyzed. This ordering is especially important for understanding the exact flow of events, such as, may be necessary for problem determination. One way to achieve ordering is by using time stamps.

The ordering of trace records using time stamps is made difficult when frequencies of processors change. Typically, these time stamps and ordering of records are based on cycle information that is generated based on the frequency of a processor.

Thus, if the frequency of a processor changes, the time stamp typically assigned to the trace record may become inaccurate with respect to other trace records generated when the frequency of the processor was at a previous, different frequency with respect to trace records generated for other processors. This inaccuracy does not cause problems with respect to the order of trace records within a trace or a particular processor. The problem occurs when trace records are merged from different traces from different processors. With the variances in frequencies, an incorrect ordering of trace records from different traces may occur when these records are merged for analysis. Further, if different processors have different frequencies, the use of cycles to identify the times during which different states occur also may become misleading.

SUMMARY OF THE INVENTION

The aspects of the present invention provide a computer implemented method, apparatus, and computer usable program code for managing trace records. A set of traces is generated for a set of processors. A trace is generated in the set of traces for each processor within the set of processors. A record of the frequency change is stored in the set of traces in response to a frequency change in a processor within the set of processors. Trace records are merged using the record(s) of the frequency changes to determine a real-time order of the records.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
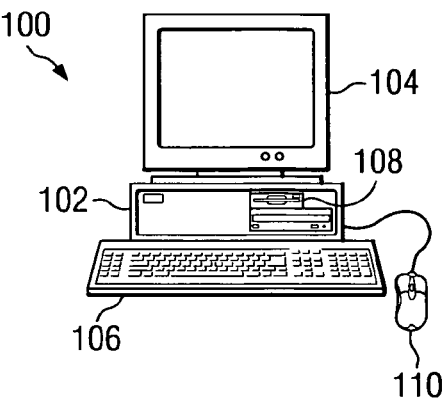
FIG. 1 is a pictorial representation of a data processing system in which the aspects of the present invention may be implemented.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
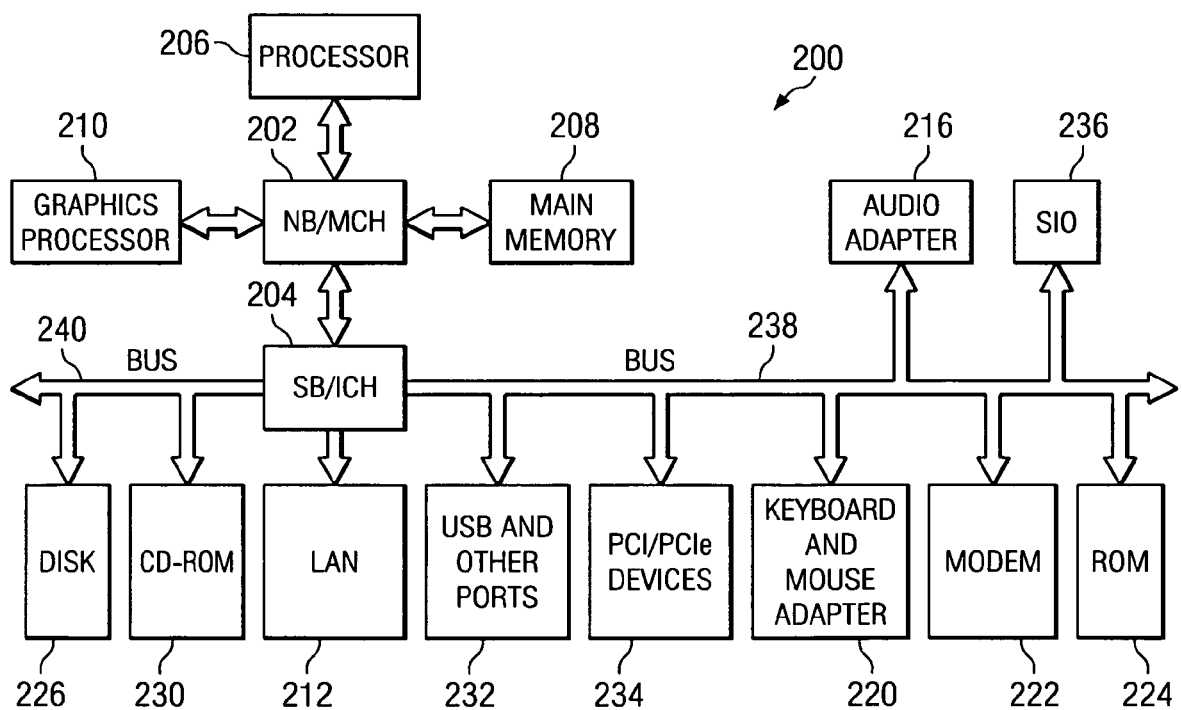
FIG. 2 is a block diagram of a data processing system shown in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are connected to north bridge and memory controller hub 202. Graphics processor 210 may be connected to the MCH through an accelerated graphics port (AGP), for example.

In the depicted example, local area network (LAN) adapter 212 connects to south bridge and I/O controller hub 204 and audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention are performed by processor 206 using computer implemented instructions, which may be located in a memory such as, for example, main memory 208, read only memory 224, or in one or more peripheral devices.

Those of ordinary skill in the art will appreciate that the hardware in FIGS. 1–2 may vary depending on the implementation. Other internal hardware or peripheral devices, such as flash memory, equivalent non-volatile memory, or optical disk drives and the like, may be used in addition to or in place of the hardware depicted in FIGS. 1–2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1–2 and above-described examples are not meant to imply architectural limitations. For example, data processing system 200 also may be a tablet computer, laptop computer, or telephone device in addition to taking the form of a PDA.

The aspects of the present invention provide a computer implemented method, apparatus, and computer usable program code for adaptive tracing when different processor frequencies occur during a trace. In the illustrative embodiments, records are generated to identify changes in processor frequencies while traces are created for a set of processors. In these examples, frequency change records are placed into the trace when these frequency changes occur. When tracing completes, the traces for the different processors records are merged with ordering of records being based on a selected trace in these examples.

In these examples, a trace for one of the processors is selected as a base trace and used to merge the trace records from the trace for other processors. The frequency change records for the traces are identified. The elapsed time from the prior event to the current event is identified. The first interrupt occurring in any of the traces is identified as the current event. The start of the trace is a prior event in this example. An event may be the beginning of the trace, the end of the trace, or the occurrence of the interrupt indicating a change of processor frequency for the end of the trace. In particular, the elapsed time is identified between events using the base trace. Frequency change records are records identifying an occurrence of an interrupt indicating that a processor frequency has changed.

Afterwards, the cycles for each trace are identified from the prior event up to the point at which the new event occurred. In this example, the prior event is the beginning of the trace and the new or current event is the first frequency change record identifying a change in processor frequency. The real frequency for each trace is calculated using the number of cycles in that trace and the elapsed time for the base trace. Thereafter, the time stamps are adjusted for the records and the records up to the point at which the event occurred or merged. This process is performed for each event that occurs to merge all of the trace records from the different traces in a manner that takes into account the different processor frequencies.

Figure 3:
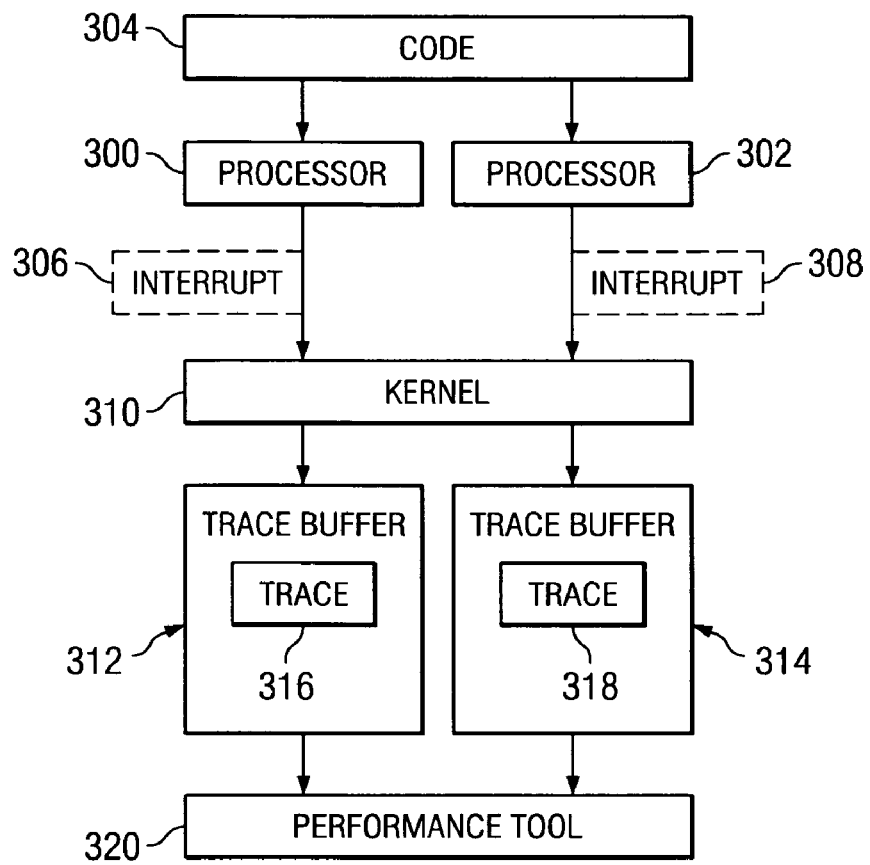
FIG. 3 is a diagram illustrating components used in generating and merging traces in accordance with an illustrative embodiment of the present invention.

Turning now to FIG. 3, a diagram illustrating components used in generating and merging traces is depicted in accordance with an illustrative embodiment of the present invention. In this example, processor 300 and processor 302 execute code 304. Interrupts 306 and 308 are generated by processors 300 and 302 respectively. These interrupts are received by kernel 310 and trace records are stored within trace buffers 312 and 314. In these examples, each processor is assigned a separate trace buffer. As a result, interrupt 306 results in data being stored in trace 316 within trace buffer 312 for processor 300. Interrupt 308 causes a trace record or other data to be stored in trace 318 within trace buffer 314 for processor 302.

In these examples, interrupt 306 and interrupt 308 may be interrupts that occur periodically to generate trace records. Interrupt 306 and interrupt 308 also may be generated as a result of a frequency change. We call these frequency change interrupts records, frequency change records. These frequency change records also are stored within trace buffer 312 and trace 316 in these illustrative examples.

After tracing has completed, trace buffer 312 and trace 316 as well as, trace buffer 314 and trace 318 are merged into a single trace by performance tool 320. In these illustrative examples, the merging of these traces requires that the time stamps for the different trace records be accurate to merge the trace records in the correct order. Inaccuracies may cause an incorrect ordering of trace records for analysis by performance tool 320.

Performance tool 320 uses frequency change records stored within trace buffer 312 and trace 316 as well as, trace buffer 314 and trace 318 to identify the correct times for processors when frequencies change between processors 300 and 302. Performance tool 320 may be used in time profile performance analysis in these examples. Typically when a first event is detected in response to the generation of an interrupt, a record or data in some other format is placed into trace buffer 312 or trace 316. This trace also includes a time stamp for use in merging and ordering records within trace buffer 312 and trace 316.

Performance tool 320 may be implemented using a timer profiler. An example of this type of tool is the tprof tool, typically shipped with Advance Interactive Executive (AIX) operating system from International Business Machines Corporation. This type of program takes samples, which are initiated by a timer generating an interrupt. Upon expiration of a timer, the tprof tool identifies the current instruction being executed. The tprof tool is a trace tool used in system performance analysis. This type of tool provides a sampling technique encompassing the following steps: interrupt the system periodically by time; determine the address of the interrupted code along with the process identifier and thread identifier; record a trace record in a software trace buffer; and return to the interrupted code.

In typical use, while running an application of interest, a tprof trace tool wakes up periodically and records exactly where in the code the application is executing. For example, this location of where the application is executing a memory address. This tprof tool is used to generate a profile of where an application is spending time to inform those analyzing the trace information where to attempt improvements in performance of the application. Of course, performance tool 320 may be implemented using any sort of performance tool based on a particular implementation. This type of performance tool also may be used to collect and analyze the traces. During the time the application tprof is running, modules or code, such as JITed code (i.e. just-in-time compiled) may be loaded, unloaded, or overlayed. In order to produce the correct symbolic information, the information regarding the loading or unloading may be recorded in one or more of the trace buffers. In order for the symbolic information to be correct, it is important that the ordering of the information of the loaded modules be used to determine the symbolic information applicable to a tprof sample trace record.

When tracing is complete, performance tool 320 selects one of the traces, such as trace 316 as a base trace. Performance tool 320 identifies all of the frequency change records within trace 316 and trace 318. Performance tool 320 selects the first frequency change record in these two traces. The amount of elapsed time is identified from the beginning of the trace to the point at which the frequency change record occurred. These two points, the beginning of the trace and the frequency change records, are referred to as events in these examples. These records are used to identify the correct frequency for processor 302 up to that point. This frequency is identified using the number of cycles that have occurred up to the occurrence of the interrupt in trace 318. The number of cycles and elapsed time are used to identify the real frequency for processor 302 at that time. The time stamps are adjusted in trace 318. As a result, the records up to the point of the fist interrupt for both traces have been synchronized and may be merged with the records being in the correct order.

The next frequency change record is then identified. This frequency change record may occur in either trace in this illustrative example. All of the records from the last event, the prior frequency change record, to this current event, the current frequency change record, are merged using the same process. Again, the amount of elapsed time from the last frequency change record to the current frequency change record in the base trace, trace 316, are identified. The cycles occurring from the last frequency change record to the current frequency change record are identified for trace 318. Then, the real frequency for trace 318 is identified using the cycles and elapsed time. The time stamps for this set of records are adjusted and the records are merged together.

In this manner, the different aspects of the present invention take into account frequency changes that may occur in different processors. The example illustrated in FIG. 3 only shows two processors. The different aspects of the present invention may be applied to other numbers of processors other than just two processors. When the frequency of a processor is about to go to zero, a frequency change records is generated in these examples. Alternatively, no trace record indicating that the frequency is about to change to zero may be recorded; however, in this case, there must be a frequency change trace records issued when the frequency changes to a non-zero value In either case, a trace record indicating the new frequency may be recorded when the processor has a non-zero frequency.

Figure 4:
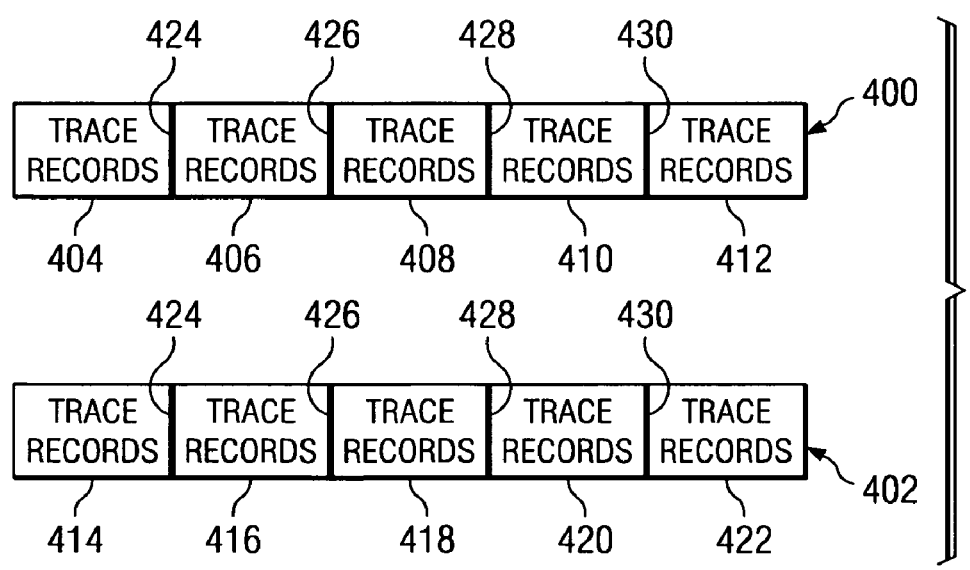
FIG. 4 is an example trace in accordance with an illustrative embodiment of the present invention.

Turning now to FIG. 4, an example trace is depicted in accordance with an illustrative embodiment of the present invention. In this example, trace 400 and trace 402 are depicted. These are traces, such as trace 316 and 318 in FIG. 3. Trace 400 contains trace records 404, 406, 408, 410 and 412. Trace 402 contains trace records 414, 416, 418, 420, and 422. Each of these groupings of trace records may contain one or more trace records. Each time an interrupt occurs in which a processor frequency changes, an frequency change record is generated and placed into each of the traces. As a result, the same frequency change record shows up in trace 400 and trace 402 even if the frequency change was generated for the processor associated with trace 400. Frequency change record 424 is located between trace records 404 and 406 and between trace record 414 and 416. Frequency change record 426 is located between trace records 406 and 408. Frequency change record 428 is located between trace records 408 and 410 and trace records 418 and 420. Frequency change record 430 is located between trace records 410 and 412 and between trace record 420 and 422.

These frequency change records are generated when a frequency change occurs for the processor for which trace 400 is created.

As an example, a performance tool, such as performance tool 320, identifies all of the frequency records present in the traces. In these examples, the frequency change records are frequency change records 424, 426, 428, and 430. One trace is selected as the base trace. In this example, the base trace is trace 402. The first interrupt generated in any of the traces is identified. In this example, frequency change record 424 is the first frequency change record within traces 400 and 402. The elapsed time that has occurred from the beginning of the trace to frequency change record 424 is identified. This elapsed time is the correct elapsed time for trace 402.

In these examples, the frequency change records contain the frequency and cycle count for all of the processors at the time frequency change record 424 is generated. Time is determined by multiplying the frequency by the cycle count of the processor associated with the base trace. Elapsed time is determined by taking the difference between two times. As an example, at frequency change 426, the trace record in trace 402 has a cycle time, Cy2 and in trace 400 has a cycle time, Cx2. Similarly, at frequency change 424 in trace 402 has a cycle time, Cy1 and in trace 400 has a cycle time, Cx1. The elapsed time for trace 402 between frequency changes 424 and 426 is (Cy2−Cy1)×frequency in 424. In trace 400, the same elapsed time between 424 and 426 is used, but the frequency is determined by elapsed time divided by (Cx2−Cx1). When calculating the time for records in trace 402, the start time may be initialized to the Cx1 cycles representing the start of the trace on that processor multiplied times the frequency of this base processor. When calculating the time for records in trace 400, the start time at frequency change record 424 would be initialized to the same start time as in trace record 424 in 402. The difference between the start cycles in trace 400 and 402 is used to offset the cycles value in trace 400. For each trace record in trace records 406, the offset from record 424 in 402 is added to the cycles value in the trace record and is multiplied by the calculated frequency to determine the elapsed time. The calculated elapsed time from trace 402 is used for each record to determine the proper ordering. The frequency change may be indicated by the hardware and only occur by the hardware on the processor for which it is occurring. However, the interrupt handler uses the Interprocessor Interrupt (IPI) mechanism to cause records to be written on the other processors. Alternatively, the operating system may initiate the frequency change and it would use the IPI mechanism to cause the notification to all the processors.

Next, the number of cycles that have occurred from the beginning of trace 400 to frequency change record 424 is identified. The real frequency for trace 400 is identified by dividing the number of cycles for the processor associated with trace 400 by the elapsed time for the processor associated with the base trace. Trace records 404 are merged with trace records 414. These trace records are the number of trace records that have been recorded up to the elapsed time for the base trace.

Then, the performance tool identifies the next frequency change record, which is frequency change record 424 in this example. The number of cycles occurring since the last frequency change record, frequency change record 424, up to the current frequency change record, frequency change record 426, are identified for trace 400. The amount of elapsed time is identified since the last interrupt. The elapsed time is identified using the base trace, which is trace 402 in this example. This elapsed time is identified by obtaining the cycle count from the last frequency change record to the current frequency change record. The cycle count is multiplied by the frequency for the processor.

In a similar fashion, the real frequency for trace 400 is identified by dividing the cycle count between the last frequency change record and the current frequency change record for the processor associated with trace 400. The real frequency is used to adjust the time stamps in trace records 406 with the adjusted time stamps, trace records 406 and trace records 416 are merged and placed in the correct order. The ordering of trace records are with respect to trace records 406 and trace records 416. The ordering of each trace record within trace records 406 already is correct. In a similar fashion, the order of each trace record within trace records 416 is correct. The correct ordering is for the merge of these trace records from the different traces.

The next frequency change record encountered in processing trace 400 and trace 402 is frequency change collected record 428. Trace records 408 are the trace records from the time between the last frequency change record and the current frequency change record. These trace records are adjusted by obtaining the cycle count from the last interrupt to the current interrupt and dividing that cycle count by the elapsed time. Again, the elapsed time is identified from trace 402. The number of cycles occurring since the last frequency change record are multiplied by the frequency to obtain the elapsed time. The actual frequency for the processor is identified by dividing the cycle count obtained for trace 400 by the elapsed time. This frequency is used to adjust the time stamps in trace records 408. Thereafter, trace records 408 are merged with trace records 418, using the adjusted time.

A similar process is performed for trace records 410 and 420 when frequency change record 430 is encountered. At the end of the trace, the same process is performed since frequency change record 430 to the end of the traces. In this manner, the trace records within trace 400 and trace 402 may be merged in the correct order by synchronizing the time of other traces with the base trace.

In these examples, the identification of the elapsed time and the identification of the real frequency for a set of records occur in response to events. These events are the beginning of a trace, a frequency change record, and the end of a trace in these examples. Only two traces are illustrated in FIG. 4 to clearly explain the different processes and features in the illustrative examples. Of course, the same process may be applied to sets of traces greater than two. In these examples, each cycle time stamp is converted to time value, such as, elapsed time from the beginning of the trace. Trace records are merged via their calculated time value. Each of the traces are examined to determine the next record with a time value that is closest to the current record being processed.

Figures 5, 6:
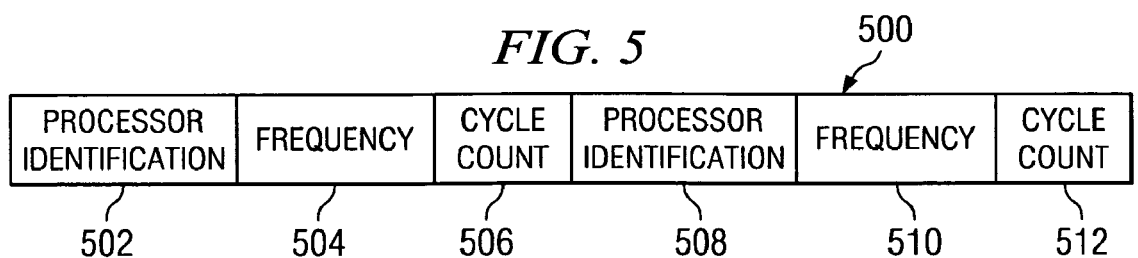
FIG. 5 is a diagram illustrating an frequency change record in accordance with an illustrative embodiment of the present invention.
FIG. 6 is a diagram for pseudo code for reading elapsed time simultaneously on processors in accordance with an illustrative embodiment of the present invention.

With reference now to FIG. 5, a diagram illustrating a frequency change record is depicted in accordance with an illustrative embodiment of the present invention. Frequency change record 500 is an example of a trace record, such as frequency change record 424 in FIG. 4. In this example, frequency change record 500 contains processor identification 502, frequency 504 and cycle count 506. These fields are for one particular processor. Processor identification may be implicit, especially if each processor gets an interrupt. Additionally, frequency change record 500 also contains processor identification 508, frequency 510, and cycle count 512. These fields are for another processor that is present.

Frequency change record 500 contains processor identification, frequency, and cycle count for each processor present in the data processing system.

Turning now to FIG. 6, a diagram for pseudo code for reading elapsed time simultaneously on processors is depicted in accordance with an illustrative embodiment of the present invention. In this example, code 600 is an example of code for a process used to issue an interprocessor interrupt to processors within a data processing system. This process may be implemented in a system kernel, a kernel extension, or device driver. The information obtained from this process is used to generate frequency change records such as those described above.

Figure 7:
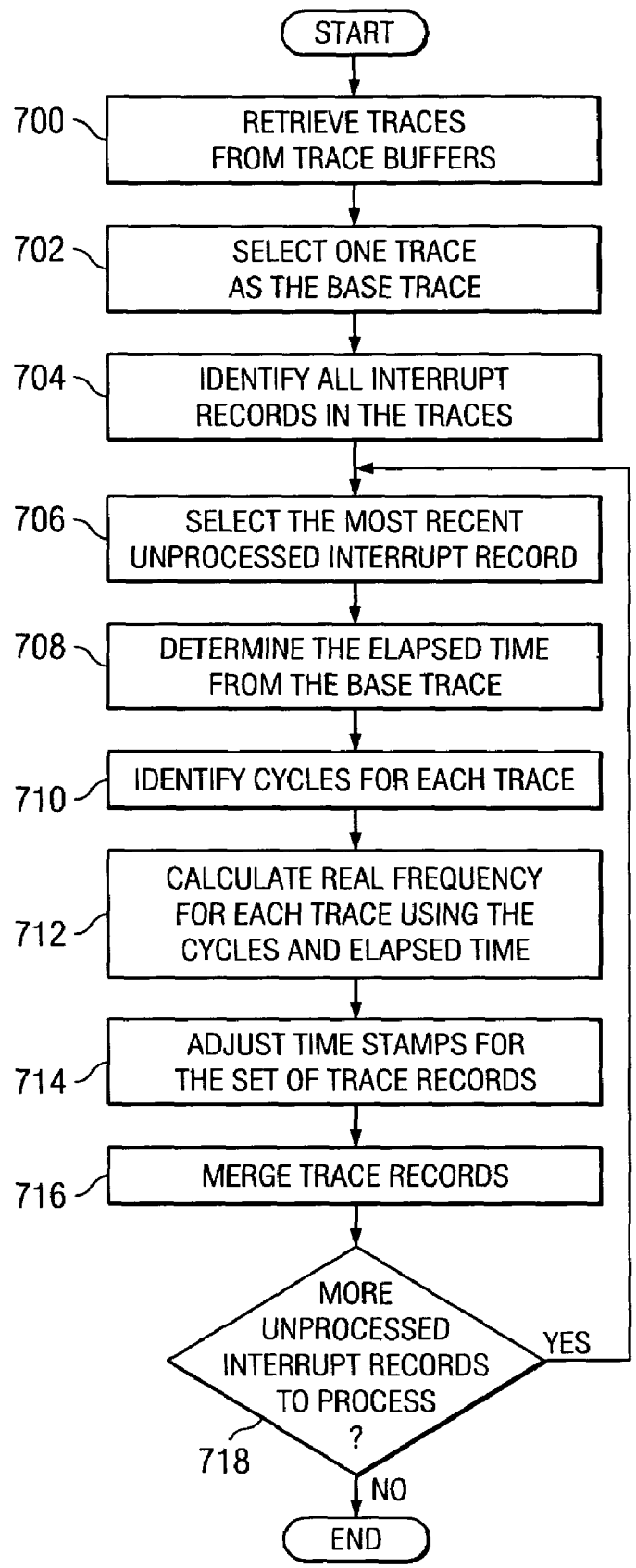
FIG. 7 is a flowchart of a process for merging records from traces in accordance with an illustrative embodiment of the present invention.

Turning now to FIG. 7, a flowchart of a process for merging records from traces is depicted in accordance with an illustrative embodiment of the present invention. The process illustrated in FIG. 7 is implemented in a performance tool, such as performance tool 320 in FIG. 3.

The process begins by retrieving traces from the trace buffers (step 700). These trace buffers may be, for example, trace buffer 312 and trace buffer 314 in FIG. 3. Thereafter, the process selects one trace as the base trace (step 702). This base trace is used to identify the elapsed time used for calculating real frequencies in these examples. Thereafter, the process identifies all frequency change records in the traces (step 704). These frequency change records are records identifying frequency changes in the processors. The process selects the most recent unprocessed frequency change record for processing (step 706).

Then, the process determines the elapsed time using the base trace (step 708). The elapsed time is identified using the number of cycles that have occurred from the last event to the current interrupt. The elapsed time is multiplied by the frequency of the processor for the base trace. The last event may be, for example, another frequency change record or the time when tracing begins.

Next, the process identifies the elapsed cycles for each trace between frequency change record (step 710). The process calculates a real frequency for each trace using the identified cycles and the elapsed time (step 712). The real frequency is calculated by dividing the elapsed cycles by the elapsed time. The time stamps for the set of records in each trace are adjusted with this value (step 714). The set of trace records are those trace records occurring from the last frequency change record up to the current frequency change record being processed. The set of trace records are then merged (step 716). This step involves merging the trace records from the different traces for which the timestamps have been adjusted.

Next, a determination is made as to whether additional unprocessed frequency change records are present in the traces for processing (step 718). If additional unprocessed frequency change records are present, the process returns to step 706 to select the next unprocessed frequency change record. Otherwise, the process terminates. As an example, the processing of the beginning and the end of a trace is handled in a similar manner as the presence of an unprocessed frequency change record. This situation is handled using the processes of the present invention as illustrated in FIG. 7.

In an example in which no processor drifts and exact frequencies are present, the following are present for a processor P1 and a processor P2: Processor P1: start tracing at 1000 cycles with a frequency of 100000 cycles/sec, next records R1: at 3000 cycles, R2 at 4000 cycles, R3 at 9000 cycles with the end tracing at 10000 cycles and processor P2: start tracing at 500 cycles with a frequency of 50000 cycles/sec next records R1 at 1000 cycles, R2 at 2000 cycles end tracing at 5000 cycles.

The delta for the base is calculated as follows: 10000 cycles−1000 cycles=9000 cycles, 9000/100000=0.09 elapsed time. For records P1R1 at 3000, the adjusted time is 3000/100000=0.03; P1R2 at 4000, the adjusted time is 4000/100000=0.04; P1R3 at 9000, the adjusted time is 9000/100000=0.09.

The delta for processor P2 is calculated as follows: 5000 cycles−500 cycles=4500 cycles, 4500/50000 is 0.09 elapsed time. For records on P2R1 at 1000, elapsed time is 1000/50000=0.05 for records on P2R2 at 2000, the elapsed time is 2000/50000=0.10. As a result, the records are merged as follows: P1R1, P1R2, P2R1, P1R2, then P1R3.

In another example in which processor drifts and inexact frequencies are present, record processing using the different aspects of the present invention is depicted. The following are present for processor P1 and processor P2: processor P1: start tracing at 1100 cycles, with a frequency of 100000 cycles/sec, next records, R1 at 3000 cycles, R2 at 4000 cycles, and R3 at 9000 cycles with the end tracing at 10000 cycles, and processor P2: start tracing at 2000 cycles, with a frequency of 200000 cycles/sec, next records, R1 at 2100 cycles, R2 at 8300 cycles, and R3 at 18000 cycles with the end tracing at 20500 cycles. The delta for the base is calculated as follows: 10000 cycles−1100 cycles=8900 cycles, 8900/100000=0.089 elapsed time. For records P1R1 at 3000, the adjusted time is (3000 cycles−1100 cycles)/ 100000 cycles=0.019 P1R2 at 4000, the adjusted time is (4000 cycles−1100 cycles)/100000 cycles=0.029 P1R3 at 9000, and the adjusted time is (9000−1100)/100000=0.079. The delta for processor P2 is calculated as follows: 20500−2000=18500 delta cycles using the elapsed base time from processor P1. An elapsed time of 0.089 seconds is present, the frequency is calculated by delta cycles divided by time=18500/0.089=207865.1685 Hz for records on P2R1 at 2000 cycles, the elapsed time is (2100−2000)/ 207865=0.000481 or records on P2R2 at 8300, the elapsed time is (8300 cycles−2000 cycles)/207865 cycles=0.030 for records on P2R3 at 18000 cycles, the elapsed time is (18000 cycles−2000 cycles)/207865 cycles=0.0769. As a result, the records are merged as follows: P2R1, P1R1, P1R2, P2R2, P2R3, then P1R3. In this example, the start time is adjusted to zero for each of the traces.

In this manner, the aspects of the present invention provide for adaptive tracing with different processor frequencies. In other words, the aspects of the present invention can take into account any change in processor frequencies during the generation of traces. The different illustrative examples allow for trace records from different traces to be merged such that the different trace records are in the correct order. The changes in processor frequencies are taken into account by using frequency change records to adjust time stamps for sets of records that are generated between events.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing trace records, the computer implemented method comprising:
   generating a set of traces for a set of processors, wherein a trace is generated in the set of traces for each processor within the set of processors,
   responsive to a frequency change in a processor within the set of processors, storing a record of the frequency change in the set of traces, wherein the record of the frequency change is in response to an interrupt from a processor indicating that a frequency change has occurred; and
   combining trace records in the set of traces using the record of the frequency change to determine a correct order for the records.

2. The computer implemented method of claim 1, wherein the record includes an identification of a processor in the set of processors, a frequency for the frequency change, and a cycle count of a number of cycles since a last frequency change for the processor.

3. The computer implemented method of claim 1, wherein the combining step comprises:
   selecting a base trace within the set of traces;
   identifying the record of the frequency change in the set of traces;
   determining an elapsed time from a prior event up to the record of the frequency change using the base trace;
   identifying cycles occurring in a second trace in the set of traces between the prior event and the record of the frequency change;
   calculating a real frequency for the second trace using the cycles and the elapsed time; and
   adjusting a time stamp for each trace record within the second trace.

4. The computer implemented method of claim 3 further comprising:
   merging all trace records between the event and the record of the frequency change in the base trace and the second trace.

5. The computer implemented method of claim 3 further comprising:
   performing the determining step, the identifying step, the calculating step, and the adjusting step for each frequency change record in the set of traces.

6. The computer implemented method of claim 5 further comprising:
   performing the determining step, the identifying step, the calculating step, and the adjusting step for each trace in the set of traces.

7. The computer implemented method of claim 3, wherein the prior event is selected from one of a frequency change and a start of a trace.

8. A computer program product comprising:
   a tangible computer readable medium having encoded thereon computer usable program code for managing trace records, said computer program product including:
   computer usable program code for generating a set of traces for a set of processors, wherein a trace is generated in the set of traces for each processor within the set of processors;
   computer usable program code for storing a record of the frequency change in the set of traces in response to a frequency change in a processor within the set of processors, wherein the record of the frequency change is in response to an interrupt from a processor indicating that a frequency change has occurred; and
   computer usable program code for combining trace records in the set of traces using the record of the frequency change to determine a correct order for the records.

9. The computer program product of claim 8, wherein the record includes an identification of a processor in the set of processors, a frequency for the frequency change, and a cycle count of a number of cycles since a last frequency change for the processor.

10. The computer program product of claim 8, wherein the computer usable program code for combining trace records in the set of traces using the record of the frequency change to determine a correct order for the records comprises:
    computer usable program code for selecting a base trace within the set of traces;
    computer usable program code for identifying the record of the frequency change in the set of traces;
    computer usable program code for determining an elapsed time from a prior event up to the record of the frequency change using the base trace;
    computer usable program code for identifying cycles occurring in a second trace in the set of traces between the prior event and the record of the frequency change;

computer usable program code for calculating a real frequency for the second trace using the cycles and the elapsed time; and computer usable program code for adjusting a time stamp for each trace record within the second trace.

11. The computer program product of claim 10 further comprising:

computer usable program code for merging all trace records between the event and the record of the frequency change in the base trace and the second trace.

12. The computer program product of claim 10, wherein the event is selected from one of a frequency change and a start of a trace.

13. A data processing system comprising:

a bus;

a communications unit connected to the bus;

a memory connected to the bus, wherein the storage device includes computer usable program code; and a processor unit connected to the bus, wherein the processor unit executes the computer usable program code to generate a set of traces for a set of processors, wherein a trace is generated in the set of traces for each processor within the set of processors; store a record of the frequency change in the set of traces in response to a frequency change in a processor within the set of processors, wherein the record of the frequency change is in response to an interrupt from a processor indicating that a frequency change has occurred; and combine trace records in the set of traces using the record of the frequency change to determine a correct order for the records.

14. The data processing system of claim 13, wherein the record includes an identification of a processor in the set of processors, a frequency for the frequency change, and a cycle count of a number of cycles since a last frequency change for the processor.

15. The data processing system of claim 13, wherein in executing the computer usable program code to combine trace records in the set of traces using the record of the frequency change to determine a correct order for the records, the processor further executes the computer usable program code to select a base trace within the set of traces; identify the record of the frequency change in the set of traces; determine an elapsed time from a prior event up to the record of the frequency change using the base trace; identify cycles occurring in a second trace in the set of traces between the prior event and the record of the frequency change; calculate a real frequency for the second trace using the cycles and the elapsed time; and adjust a time stamp for each trace record within the second trace.

16. The data processing system of claim 15, wherein the processor unit further executes the computer usable program code to merge all trace records between the event and the record of the frequency change in the base trace and the second trace.

17. The data processing system of claim 15, wherein the processor unit further executes the computer usable program code, and wherein the event is selected from one of a frequency change and a start of a trace.

* * * * *